March 20, 1962  S. LANCERINI  3,026,164
AUTOMATIC PROFILOGRAPH
Filed Oct. 5, 1959

Inventor
S. Lancerini
By
Attorneys 3,026,164
AUTOMATIC PROFILOGRAPH
Sylvio Lancerini, P.O. Box 1514, Sept-Iles,
Quebec, Canada
Filed Oct. 5, 1959, Ser. No. 844,233
Claims priority, application Italy Oct. 18, 1958
8 Claims. (Cl. 346—8)

In topographic work for land surveying (profiles and sections) there are usually used tachometers and stadias, or bubble triplometers (knife arrangements).

Both these methods require the work of several persons to handle the tachometer and the stadias or the triplometers; in addition, a clerk is needed to write down the various readings in a book. After that, the data must be entered, after the level differences have been calculated, tracing on a sheet the profile or the surveyed section on the desired scale.

With the device of the present invention, all the above-mentioned operations are reduced to letting the device, guided by a single person. go over the tract of land to be surveyed, and it automatically traces, in the chosen scale, the profile of the land with all its level differences and slopes directly on a sheet of paper, there being obtained a line whose points, in relation to a basic straight line, have as abscissae the distances travelled in horizontal projection and as ordinates the level differences, the slopes resulting at their real value.

The device, therefore, eliminates all the work of surveying by tracts of land and its tracing on a sheet, that is, it automatically reproduces already traced and in scale the profile of the land travelled by the device.

Said device consists of a carriage comprising a table provided with a plane surface on which a sheet of paper may be fastened. Said carriage is provided with a pair of co-planar supporting wheels and with a pair of shafts or handles by means of which it may be wheeled. Above the table, a slider with tracing tip can slide in longitudinal and transverse direction and hence also in any oblique direction resulting from the combination of said two movements. The displacements of the slider are controlled by a roller pivoted on the slider and rolling on the table, the rotation of the roller being controlled by one of the supporting wheels of the table, which acts as a control wheel, by means of a flexible transmission, and its orientation or direction of rolling on the plane of the table is controlled, also by flexible transmission, by a pendulum pivoted under the table.

If the rotation of the roller is controlled by said control wheel with a suitable ratio of transmission, it will travel on the plane proportional spaces in a given scale to those travelled by the wheel on the ground and in a direction depending on the slopes thereof due to its orientation controlled by the pendulum.

It is evident, therefore, that the tracing tip fixed on the slider controlled by the roller will record on the sheet of paper, fastened on the plane, a straight line when the land travelled does not have slope variations, and a zigzag or wavy line when slopes succeed each other, upward or downward. If there has previously been traced on the sheet a basic or "fundamental" longitudinal straight line parallel to the longitudinal axis of the plane and the tracing tip has been disposed thereon when starting the run, the abscissae corresponding to the various points of the line will give the distances in horizontal projection from the starting point, and the ordinates, which may be positive or negative, will indicate the level differences thereof. These values will appear in exact scale in the graph.

From the following description, referred to the annexed drawing, and illustrating schematically the device as a non-limitative example, the characteristics and advantages of the invention will be clearly evident.

Figure 1:
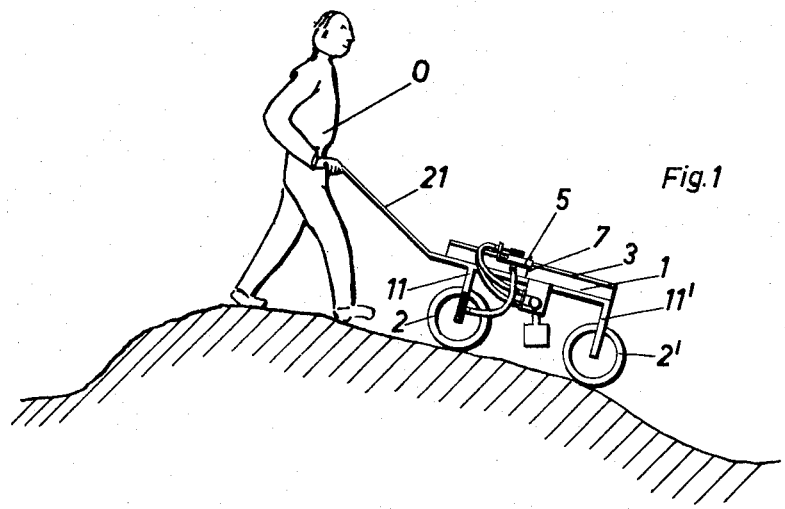
FIGURE 1 represents the method of using the profilograph device.
Figure 2:
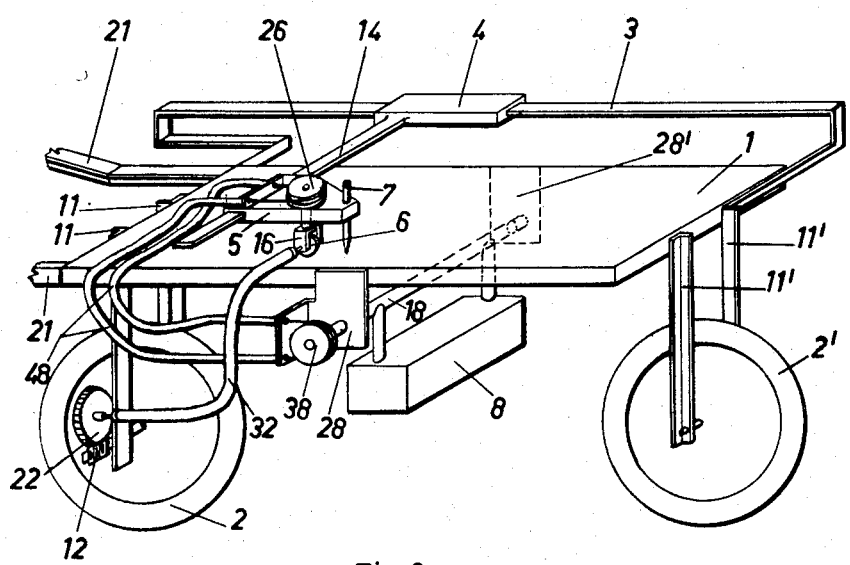
FIGURE 2 is a view in perspective of the assembly of the organs constituting the device.

With reference to the figures, 1 is a plane formed by the top surface of a rectangular wooden panel or table supported by two equal or unequal wheels in line 2 and 2' pivoted between the pairs of posts 11—11 and 11'—11', which are arranged in two planes normal to said table and passing through the longitudinal axis thereof. The said table is provided with a pair of shafts or handles 21 which are gripped with both hands by the operator O who can thus push same on its two wheels maintaining its transverse axis horizontal.

Above the table and on a longitudinal rectilinear rail 3 there can slide a slider 4 carrying at right angles with said rail 3 a rod 14 parallel with the plane of the table 1. On said rod slides guided a second slider formed by a plate 5 also disposed parallel with plane 1.

On said plate 5 is pivoted vertically, and hence perpendicularly to plane 1, a fork 16 in which rotates a knurled roller 6 which rolls on table 1. The said plate 5 is also provided with a vertical tracing tip 7, pencil or other, which bears upon said plane.

Under the table 1 oscillates a pendulum 8 suspended from a shaft 18 rotating in two flanges 28 and 28' fastened on the two longitudinal flanks of table 1, the oscillations being suitably damped.

The axis of rotation of shaft 18 for oscillation of the pendulum 8 is thus parallel with the axes of rotation of the two wheels.

The oscillations of the pendulum 8. caused by the slope of the ground, produce the rotation of the shaft 18 which by means of its pulley 38 and of the pair of flexible cables 48 is transmitted to the pulley 26 cottered on the vertical pin of the fork 16.

It thus occurs that the angular displacements in the two directions of the pendulum 8 produce corresponding angular shiftings also in the two directions of the fork, orienting the roller 6 in various directions.

On the axis of the rear wheel 2 is mounted a reduction gear composed of a worm screw 12 and a helicoidal wheel 22 which by means of a transmission with flexible shaft 32 drives the roller 6.

It is evident that when going over a terrain pushing the table 1, the roller 6 will roll on said plane driven by said control wheel 2 of the carriage, orienting itself according to the angular displacements to the right or left of the pendulum mass in relation to the vertical caused by the upward or downward slopes of the ground.

As a result of the possibility of displacement of plate 5 in a plane parallel to 1 and along two directions at right angles to each other (displacement along rod 14 and displacement thereof along rail 3), roller 6 can roll in any direction taking with it the tracing tip 7, which records on the paper spread out on table 1 the profile of the terrain on a reduced scale for the travels as a function of the diameter of wheel 2, of the ratio of transmission screw 12 to helicoidal wheel 22, and of the diameter of roller 6, while the slopes will be true when the diameters of pulleys 38 and 26 controlling the orientation of roller 6 are equal, to the angular displacements of pendulum 8 in relation to the vertical being equal to the inclinations on the horizontal of the straight line passing through the points of contact on the carriage wheels on the ground.

Repeating what has been said before, when one travels with the carriage described over a level terrain, or one with undulations or ascending or descending slopes, and when at the beginning the rear driving wheel has been made to coincide with the starting point and the tracing tip with the origin of a straight line traced on the sheet and parallel with the longitudinal axis of the plane, there will be obtained for every rectilinear tract traveled and 'passed':

(a) That, starting from the point of origin, the two orthogonal coordinates of each point of the traced line referred to the basic or "fundamental" straight line will correspond in scale to the horizontal projection of the distances travelled and to the level difference in relation to the starting point;

(b) That in a zigzag course it will be sufficient at each change of direction to stop and to mark on the paper the new walking direction, possibly adding the compass angle, and then resuming in straight line until a new change of direction occurs;

(c) That by graduating, the two rods 14 and 3, according to the chosen scale, one can at any time read the distance travelled in horizontal projection and the level difference in relation to the starting point;

(d) That the traced slopes are the actual ones and hence are measurable in degrees besides being calculable in "percent" on the basis of the ordinates of the two points between which they are comprised.

It is evident, therefore, that the carriage reproduces directly traced in scale the profile of the terrain travelled with all its undulations.

In the practical materialization of the carriage many variants are possible, both in the execution of the various movements and control and in the various structural details, as well as in the quality of the materials, etc., but all these variants are of course always included in the wider scope of the inventive idea as illustrated and described and as claimed below.

I claim:

1. A profilograph for the surveying and automatic tracing of the true profile of the terrain traveled at a reduced scale and in which the traced slopes are equal to the actual, said profilograph being constituted by a carriage comprising a table, two coplanar wheels for supporting the same, a guide rail disposed parallel to and on one of the longitudinal sides of the table, a slide on the guide rail, a rod projecting from said slide perpendicularly to the guide rail and parallel to the table, another slide including a horizontal plate slidable on said rod, a fork vertically pivoted in the last-mentioned slide, a roller supported by the fork and rolling on the table for supporting the horizontal plate and the projecting rod, a reduction gear means driven by the axis of one of the two wheels, a flexible shaft connected between said reduction gear means and the roller which transmits at reduced speed the rotation of said wheel to the roller, a pendulum suspended under the table, a flexible transmission connecting at a suitable ratio the axis of oscillation of the pendulum to the vertical axis of the fork, and a tracing tip fixed vertically on the slidable plate and directed toward the table.

2. Profilograph according to claim 1, characterized by the fact that the transmission between the axis of the pendulum and the vertical pin of the fork occurs with a ratio of 1:1, so that angular displacements to the right or left of the pendulum mass relative to the vertical correspond to equal angular rotations in one or the other direction of the fork relative to a straight line parallel to the longitudinal axis of the panel and chosen as basic or "fundamental" straight line of the graph.

3. A profilograph according to claim 1, in which the said carriage is provided with a pair of handles for moving the device by maintaining the said table horizontal in transverse direction.

4. A profilograph according to claim 1, in which the said roller has a roughened peripheral surface.

5. A profilograph according to claim 1, in which the roller is controlled by the rear wheel of the said carriage through a reduction gear applied to said wheel and driving one end of said flexible shaft, the opposite end of said shaft fastened to the pivot of said roller.

6. A profilograph according to claim 1, in which the pendulum hanging under said carriage has its axis of oscillation parallel to those of the carriage wheels.

7. A profilograph according to claim 1, in which the flexible transmission connecting the said axis of oscillation of the pendulum to the said vertical pin of the fork comprises two pulleys of equal diameter, a shaft for the pendulum, one pulley fastened to the pendulum shaft and the other pulley fastened to the pin of the fork, said pulleys being connected together by a flexible transmission.

8. A profilograph for the surveying and automatic tracing of the profiles of the land comprising a carriage including a table provided with a plane surface on which a sheet of paper or the like may be removably fastened, a pair of coplanar wheels supporting said table, means for shifting the said table on its two wheels by maintaining the transverse axes of the wheels horizontal, a straight guide rail arranged longitudinally on one side of said table, a slide slidable on said rail and provided with a transverse guide bar, a plate slidable along said transverse guide bar provided with a tracing tip in contact with said table and carrying a roller carried by a fork supported by a vertical pivot pin, a pendulum mounted below said table so as to be capable of oscillating about an axis parallel to a transverse axis of said table, a first transmission including a step-down gear driven by one of said two wheels for causing said writing-tip-carrying plate to advance proportionally to the advancing path of said wheels, and a transmisison operated by said pendulum for shifting said plate transversely on its guide bar by an amount which is proportional to the oscillations of said pendulum, with respect to said table, the whole being so arranged that on the sheet of paper or the like fastened on said table the writing tip traces an exact profile at reduced scale of the path traveled by said pair of coplanar wheels, the traced slopes being equal to the actual.

References Cited in the file of this patent
UNITED STATES PATENTS

| | | |
|---|---|---|
| 385,827 | Snapp | July 10, 1888 |
| 536,906 | Aramburn | Apr. 2, 1895 |
| 565,695 | Smith et al. | Aug. 11, 1896 |
| 1,666,563 | Hogen | Apr. 17, 1928 |
| 1,746,420 | Fung | Feb. 11, 1930 |